(12) United States Patent
Bidenbach et al.

(10) Patent No.: US 8,249,095 B2
(45) Date of Patent: Aug. 21, 2012

(54) COMMUNICATION DEVICE AND METHOD FOR IMPROVED SYNCHRONOUS DATA TRANSMISSION

(75) Inventors: Reiner Bidenbach, Vörstetten (DE); Martin Bayer, Vörstetten (DE); Hans-Jörg Fink, Freiburg (DE)

(73) Assignee: Micronas GmbH, Freiburg I. Br. (DE)

( * ) Notice: Subject to any disclaimer, the term of this patent is extended or adjusted under 35 U.S.C. 154(b) by 491 days.

(21) Appl. No.: 12/350,580

(22) Filed: Jan. 8, 2009

(65) Prior Publication Data

US 2009/0180497 A1 Jul. 16, 2009

(30) Foreign Application Priority Data

Jan. 11, 2008 (EP) .................................... 08000463

(51) Int. Cl.
*H04L 12/403* (2006.01)
(52) U.S. Cl. .................... 370/447; 370/449; 370/451
(58) Field of Classification Search .................. 710/110; 370/451, 447, 449
See application file for complete search history.

(56) References Cited

U.S. PATENT DOCUMENTS

| | | | | |
|---|---|---|---|---|
| 4,949,337 | A * | 8/1990 | Aggers et al. ................. | 370/451 |
| 6,389,497 | B1 * | 5/2002 | Koslawsky et al. ........... | 710/242 |
| 2007/0282459 | A1 * | 12/2007 | Schafer et al. ................. | 700/4 |
| 2008/0034140 | A1 * | 2/2008 | Kai ................................ | 710/119 |
| 2008/0059667 | A1 * | 3/2008 | Berenbaum et al. .......... | 710/110 |
| 2009/0052315 | A1 * | 2/2009 | Kollner et al. ................ | 370/212 |

FOREIGN PATENT DOCUMENTS

WO  WO 2007/068581  *  6/2006

OTHER PUBLICATIONS

Koopman, Jr. et al., "Time Division Multiple Access Without a Bus Master", UTRC Technical Report No. RR-9500470, Jun. 30, 1995, United Technologies Research Center, <http://www.ece.cmu.edu/~koopman/jtdma/jtdma.html>, Apr. 14, 2003.

* cited by examiner

*Primary Examiner* — Huy D Vu
*Assistant Examiner* — Omer Mian
(74) *Attorney, Agent, or Firm* — Muncy, Geissler, Olds & Lowe, PLLC

(57) ABSTRACT

Disclosed is a method and device for transmitting data between at least two transmitters and a receiver which are connected to a bus. A synchronization signal is applied to the bus and a number of data volume counters corresponding to the number of transmitters reduced by one is set to a predefined initial value. A first transmitter transmits in the form of data elements a predefined data volume allocated to the transmitter over the bus to the receiver. The data volume values of the other transmitters are selected so that only one transmitter at any given time simultaneously transmits on the bus.

10 Claims, 4 Drawing Sheets

COMMUNICATION DEVICE AND METHOD FOR IMPROVED SYNCHRONOUS DATA TRANSMISSION

Figure 1:
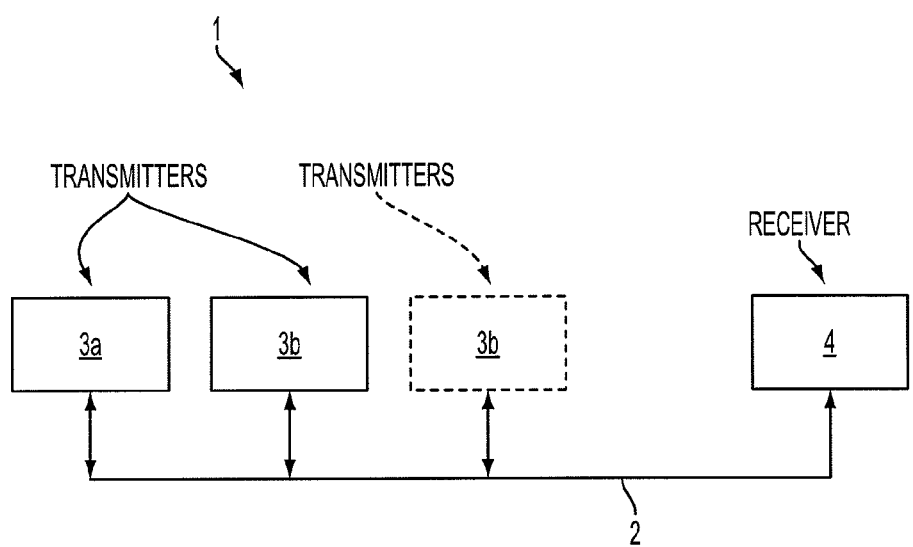

The invention relates to a method for transmitting data between at least two transmitters and at least one receiver, wherein the transmitters and the at least one receiver are connected to a bus. The invention further relates to a communication device with at least two transmitters connected to a bus and at least one receiver connected to a bus, wherein the transmitters always have at least one data source and a first bus interface connected thereto, and wherein at least the one receiver has a data sink and a second bus interface connected thereto.

Such a method and such a communication device are known in practice. The communication device is installed in a motor vehicle and has several transmitters, each of which has, as a data source, a sensor for detecting a physical quantity for measurement. By means of the sensors, measurements are read and stored in a data storage unit integrated in the transmitters. The measurements can be imported from the data storage unit and transmitted over a bus to a receiver configured as a control mechanism. For transmission of the measurements, the control mechanism first transmits a corresponding request to one of the sensors over the bus, whereupon the respective sensor transmits the data on the bus. The data are then imported from the bus to the control mechanism. The transmitters can also transmit on the bus without a previous request by the control mechanism. To this end, the communication device has an arbitration logic, which controls the data transmission over the bus. The purpose of the arbitration logic is to prevent several bus participants from transmitting on the bus at the same time and in turn prevent transmission errors. A disadvantage, however, resides in the communication device in that the arbitration logic in particular is quite expensive. A further disadvantage resides therein in that the individual bus participants (transmitters, receivers) require oscillators with long-term stability as timers. The latter, however, are relatively expensive.

Another communication device is also known in practice, which device has several transmitters, each of which is connected to a central control mechanism via its own data link. The individual transmitters continuously transmit data to the control mechanism via their individually allocated data links. The cost of the cabling, however, increases rather steeply as the number of sensors is increased. Furthermore, the control mechanism must have a correspondingly large number of input and/or output ports.

The object is therefore to develop a method and a communication device of the aforementioned type which enable, in a simple manner, data transmission between the transmitters and the at least one receiver.

This object is achieved for the method by the following procedural steps:
a) Application of a synchronization signal to the bus and setting to a predefined initial value at least a number of data volume counters corresponding to the number of transmitters reduced by one,
b) Carrying out the following steps for a first transmitter:
   b1) Transmission of a data element from the transmitter over the bus to at least the one receiver,
   b2) Determination of the transmitted data volume,
   b3) Comparison of the transmitted data volume with a predefined data volume allocated to the transmitter,
   b4) If the measured data volume is smaller than the predefined data volume: repetition of steps b1)-b4),
c) Carrying out the following steps for each additional transmitter:
   c1) Reception of a data element from the bus,
   c2) Adjusting the counter reading of a data volume counter allocated to the respective transmitter according to the received data volume,
   c3) Comparison of the counter reading with a predefined data volume value allocated to the respective transmitter,
   c4) If the counter reading has not yet reached the predefined data volume value: repetition of steps c1)-c4),
   c5) Carrying out of steps b1)-b4),
wherein the data volume value of the other transmitter is chosen or the data volume values of the other transmitters are chosen so that at any given time only one transmitter is simultaneously transmitting on the bus.

In an advantageous manner, the data transmission thus takes place over the common bus or the common bus Sink in a sequence specified by the configuration of the transmitters. One after another, the individual transmitters thus keep transmitting data elements over the bus until a data volume specified for the respective transmitter is transmitted from the data source of the transmitter to the bus. Initially a first transmitter transmits its data on the bus. The transmitter that is next in line for data transmission only starts transmitting data if the transmitter in the process of transmitting on the bus has completed the transmission process. The time at which the individual transmitters start transmitting data is determined by the transmitters that transmit their data on the bus after the first transmitter, in each case by monitoring the bus and, on the basis of a synchronization signal, measuring the data volume transmitted over the bus and comparing it with a predefined data volume value allocated to the respective transmitter. As soon as said data volume value is reached, the respective transmitter starts transmitting data. A collision due to several transmitters simultaneously transmitting on the bus is thus avoided at the outset. Preference is given to cyclical data transmission over the bus, wherein additional data transmission cycles are carried out in like manner after the ending of a first data transmission cycle. The data transmission method of the invention is advantageously suited for application in a redundant system, for example, a position sensor for an adjustment element having a plurality of sensor elements. Such an adjustment element can in particular be a throttle valve or a gas pedal of a motor vehicle.

In a preferred embodiment of the invention, for at least two data elements the time interval for the transmission from the transmitter to the at least one receiver over the bus is different. In particular, this is achievable through representation of a data element with an information content of several bits by a bus signal having at least a first signal level and at least a second signal level, wherein the duration of at least one of said signal levels is a function of the information stored in the data element.

In an advantageous embodiment of the invention, at least one transmitter checks the plausibility of the data elements transmitted over the bus and emits a status signal, which is based on the result of this check, on the bus. The status signal can then be imported by the other bus participants (transmitters, receivers), in order to discard, should the need arise, the data imported into the receiver from the bus in the event of an error and to retransmit the data in which the transmission error occurred from the transmitters over the bus to the receiver. Preference is given to transmission of the status signal on the bus after the end of a data transmission cycle. A data transmission cycle is to be understood as the time interval between the application of the synchronization signal to the bus and the point in time when all of the transmitters connected to the bus have transmitted their allocated data volumes on the bus.

Preference is given to determining, for at least one transmitter, the length of time during which the respective transmitter is in line for transmission of its data elements on the bus, wherein the measured length of time is compared with a threshold value, and wherein another transmitter carries out the steps b1)-b4) mentioned in claim 1 in the event that the measured length of time corresponds to and/or is greater than the threshold value. Data transmission over the bus is thus still possible should a transmitter fail and/or malfunction.

The aforesaid object is achieved for the communication device of the aforementioned type wherein a provision is made for a mechanism for transmitting a synchronization signal on the bus, wherein the first bus interfaces always have a transmitter mechanism connected to the bus, a receiver mechanism connected to the bus and to a control mechanism, a measuring device connected to said receiver mechanism and comprising a data volume counter for measuring the volume of data transmitted over the bus, and a comparator connected to said measuring device and to said control mechanism for comparing the counter reading of the data volume counter with at least one predefined data volume value, wherein the control mechanism of a first transmitter is control-connected to the receiver mechanism and to the transmitter mechanism of said first transmitter so that, after receiving the synchronization signal, data of a predefined first data volume are transmitted on the bus from the data source of the first transmitter by means of the transmitter mechanism, wherein the control mechanism of at least a second transmitter is control-connected to the transmitter mechanism of said second transmitter so that, after receiving a predefined second data volume allocated to the respective second transmitter, data of a predefined third data volume are transmitted on the bus from the data source of the respective second transmitter by means of its transmitter mechanism, and wherein the first data volume, at least a second data volume, and at least a third data volume are selected so that at any given time only one transmitter simultaneously transmits on the bus.

The access to the common bus takes place cyclically, according to a sequence defined by the configuration of the transmitters, wherein the individual senders sequentially transmit data over the bus to at least the one receiver. In a simple manner, the communication device avoids a collision on the bus. The receiver apparently receives the data from just one element. The underlying bus structure is not visible to the receiver. For the receiver, this leads to considerable simplification of the data analysis.

ft is advantageous if the communication device has a mechanism for transmitting a cycle length signal on the bus, if the transmitters always have a timer for generating a timer signal connected to the transmitter mechanism, if at least one timer has an adjustment mechanism for setting the cycle length of its timer signal, and if the adjustment mechanism is control-connected to the receiver mechanism of the respective transmitter so that the cycle length of the timer signal is adjustable as a function of the length of the cycle length signal. The timers of the individual transmitters can then easily adjust their cycle lengths according to the cycle length signal so that the timers of all transmitters connected to the bus then work in synchronization with each other. Because the cycle length signal is cyclically transmissible on the bus, the timers do not require long-term stability. It is thus possible to manufacture the timers easily and economically. Preference is given to integration of the mechanism for transmitting the cycle length signal in one of the transmitters. This transmitter can serve as the master transmitter and, should the need arise, also transmit the synchronization signal on the bus.

In a preferred embodiment of the invention, the data source has at least one sensor for detecting a measurement signal. Such a sensor can be a magnetic field sensor, particularly a Hall effect sensor.

The transmitter mechanism advantageously comprises a pulse width modulator with which a data signal having at least one first data signal section having a first signal level and one second data signal section having a second signal level can be generated, and wherein the length of at least one of said data signal sections is a function of information stored in the data signal. Independently of the information stored therein, the data signals generated as a function of the data elements to be transmitted over the bus can then have at any given time only two signal levels or one slope, thereby resulting in a corresponding reduction of the incidence of EMV interferences in the data transmission.

It is advantageous if at least one transmitter has a mechanism for checking the plausibility of the data received from the bus and if preference is given to said mechanism for checking the plausibility being control-connected to the transmitter mechanism so that a status signal based on the result of the plausibility check is emittable on the bus. Should an error in the data transmission be ascertained, the corresponding data can be discarded, should the need arise. Furthermore, there is the possibility of retransmitting the data in which the transmission error was ascertained over the bus.

In a preferred embodiment of the invention, at least one transmitter has a measuring device for determining the length of the time during which another transmitter is in line for transmission of data on the bus, wherein said measuring device is connected to a comparator for comparing the length of time with a threshold value, and wherein said comparator is control-connected to the transmitter mechanism of said first-mentioned transmitter so that in the event the measured length of time corresponds to and/or is greater than the threshold value, data of the predefined data volume allocated to the first-mentioned transmitter are transmitted from the data source of said transmitter on the bus by means of the transmitter mechanism. Particularly stable data transmission over the bus to the receiver is enabled by this measure.

Figure 2:
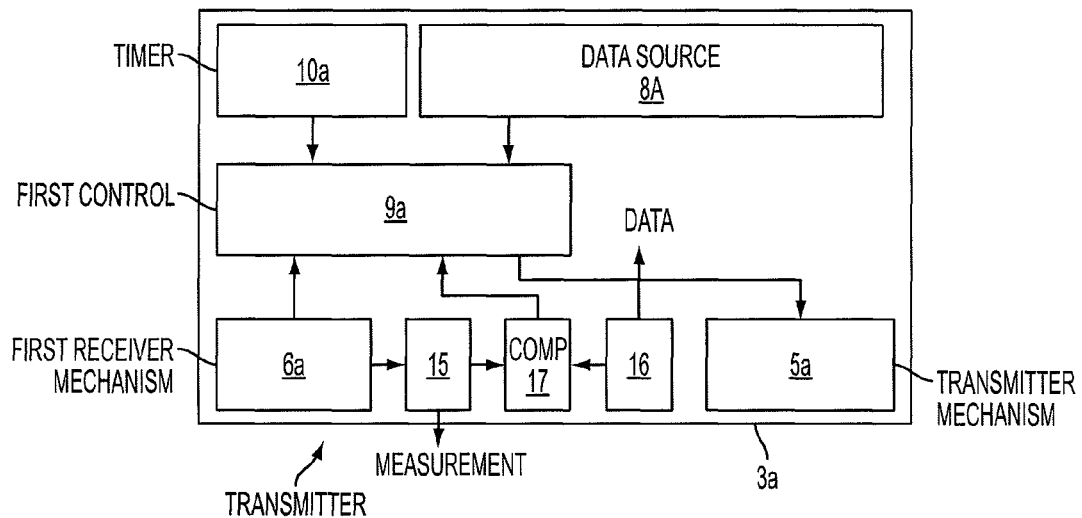
Figure 3:
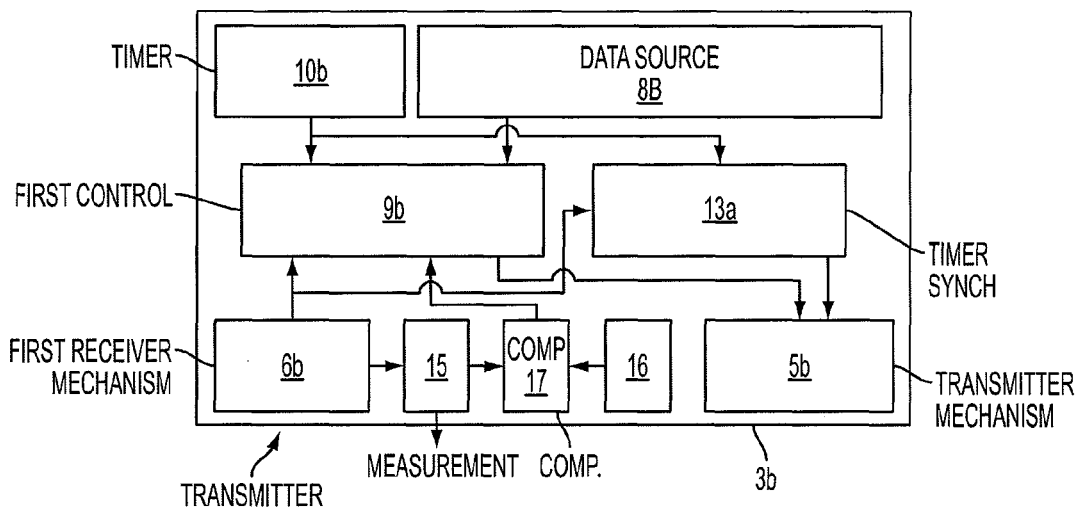
Figure 4:
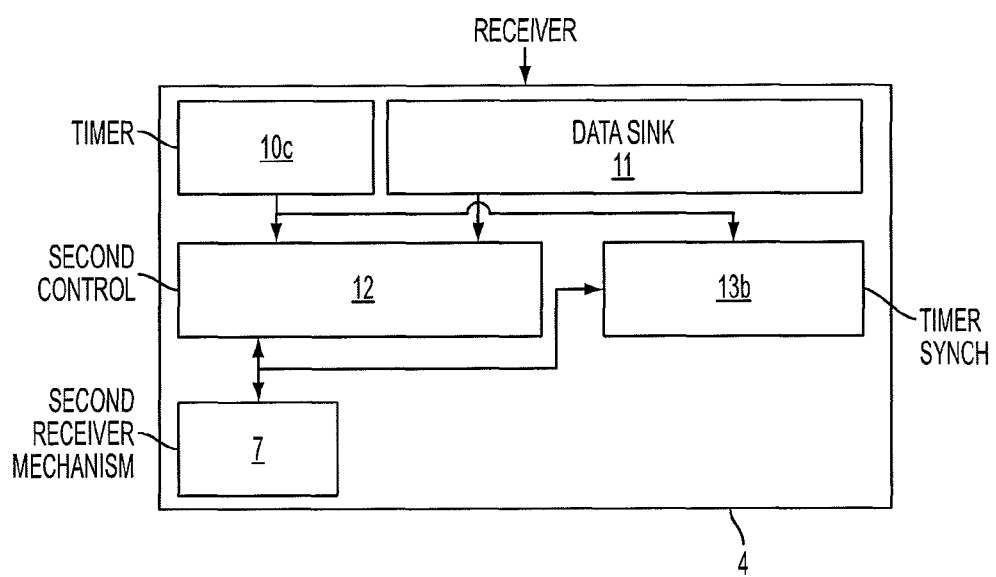
Figure 5:
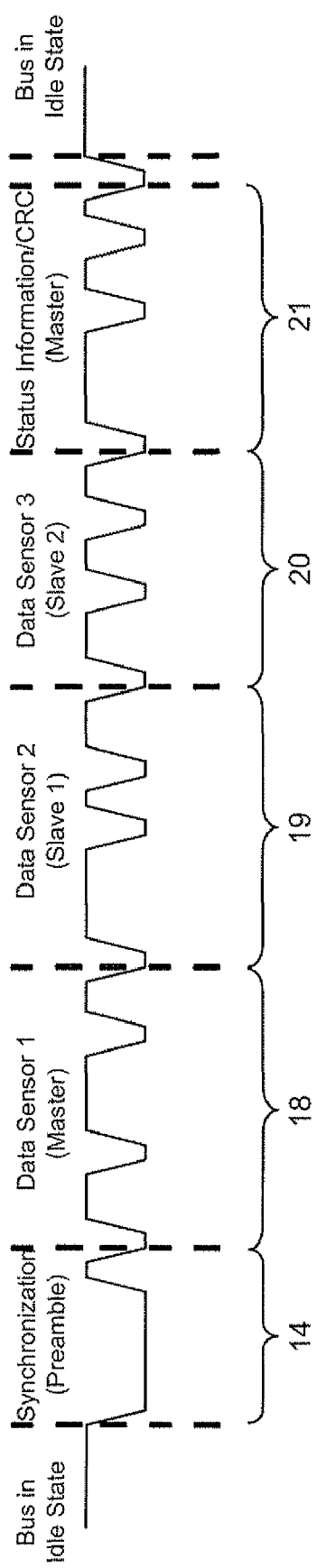

An illustrative embodiment of the invention is explained in more detail in the following, with reference to the drawing, wherein:

FIG. 1 shows a schematic illustration of a communication device having a plurality of transmitters and one receiver, which are connected with each other via a data bus, FIG. 2 shows a block diagram of a first transmitter acting as a master transmitter, FIG. 3 shows a block diagram of a second transmitter configured as a slave transmitter, FIG. 4 shows a block diagram of the receiver, and FIG. 5 shows a schematic illustration of signals transmitted over the bus.

A communication device designated in its entirety by 1 in FIG. 1 has a bus 2 to which a plurality of transmitters 3a, 3b and a receiver 4 are connected. For communication over the bus 2 the transmitters 3a, 3b in each case have a first bus interface and the receiver 4 has a second bus interface. It can be discerned in FIGS. 2 and 3 that the first bus interfaces in each case comprise a transmitter mechanism 5a, 5b and a first receiver mechanism 6a, 6b. The receiver 4 has a second receiver mechanism 7. The transmitter mechanisms 5a, 5b, the first receiver mechanisms 6a, 6b, and the second receiver mechanism 7 are in each case connected to the bus 2.

Each transmitter 3a, 3b always has a data source 8a, 8b, which has a sensor, which is not shown in any greater detail in the drawing, for detecting a digital measurement signal. The data source 8a, 8b is always connected via a first control mechanism 9a, 9b to the transmitter mechanisms 5a, 5b of the respective transmitter 3a, 3b. Furthermore, each transmitter 3a, 3b has a timer 10a, 10b, which is connected to the first control mechanism 9a, 9b. Furthermore, the first control mechanism 9a, 9b of each transmitter 3a, 3b is always connected to the first receiver mechanism 6a, 6b of the respective transmitter 3a, 3b.

It can be discerned in FIG. 4 that the receiver 4 has a data sink 11. The latter may comprise, for example, a data storage unit in which digital measurement signals or measurement values from the individual data sources 8a, 8b transmitted over the bus 2 can be stored. The data sink 11 is connected to the second receiver mechanism 7 via a second control mechanism 12. Furthermore, the second control mechanism 12 is connected to a timer 10c allocated to the receiver 4.

The transmitter 3a acts as a master and has a mechanism for generating a master timer signal, which is formed by frequency division from an output signal of the timer 10a. The master timer signal can be transmitted on the bus in the form of a synchronization signal 14 by means of the transmitter mechanism 5a of the transmitter 3a. During the transmission of the synchronization signal 14, the bus is set to a predefined signal level for a time interval lasting for a predefined number of timer cycles of the master timer signal.

The sensors 3b are configured as slaves and in each case have a timer synchronization mechanism 13a, which is connected to the timer 10b and the receiver mechanism 6b of the respective sensor 3b. By means of the timer synchronization mechanism 13a, when the synchronization signal 14 occurs, a timer signal generated in the respective sensor 3b by frequency division from an output signal of the timer 10b is synchronized in terms of frequency and phasing.

In like manner the receiver 4 is configured with a timer synchronization mechanism 13b, which is connected to the timer 10c and the second receiving mechanism 7. By means of the timer synchronization mechanism 13b, when the synchronization signal 14 occurs, a timer signal generated in the receiver 4 by frequency division from an output signal of the timer 10c is synchronized to the master timer signal of the sensor 3a in terms of frequency and phasing.

So that the individual transmitters 3a, 3b can jointly use the bus to transmit data from the data sources 8a, 8b to the data sink 11 without a collision occurring during the data transmission, the transmitters 3b configured as slaves always have at least a measurement mechanism 15 with a data volume counter for measuring the volume of the data transmitted over the bus.

The measurement mechanism 15 is always connected via a comparator 17 to the control mechanism 9b of the transmitter 3b for comparison of the counter reading of the data volume counter with a predefined data volume value 16 allocated to the respective transmitter 3b.

As can be discerned with the aid of the timing diagram in FIG. 5, at the beginning of a data transmission cycle, the transmitter 3a configured as a master first transmits the synchronization signal 14 on the bus 2. The synchronization signal 14 is received by the transmitters 3b configured as slaves and the receiver 4, whereupon the latter in each case synchronize their timer signals generated from the output signal of the timer 10b or 10c with the master signal of the transmitter 3a. Upon receipt of the synchronization signal 14, the transmitters 3b always set the counter reading of their respective data volume counters to a predefined initial value, the value of which can be, for example, zero.

Following the synchronization signal 14, the transmitter 3a, henceforth also designated as the first transmitter 3a, transmits the data furnished by its data source 8a on the bus 2. The corresponding data signal is designated by 18 in FIG. 5. The data have a predefined first data quantity or a predefined first data volume. The data are transmitted on the bus as data elements, which can contain, for example, 4 bits of information in each case.

A first section of each data element has a first signal level and a second section a second signal level, respectively. The first section has a fixed time interval and the second section has a time interval that varies as a function of the information allocated to the data element and to be transmitted over the bus, with said time interval corresponding to the first time interval or a multiple thereof, depending on the information.

After each transmission of a data element, the first transmitter 3a always measures the data volume that it transmitted on the bus and compares it with the predefined data volume allocated to the first transmitter 3a, If the measured data volume is smaller than the predefined data volume, the aforementioned steps are repeated, i.e., the first transmitter 3a transmits another data element on the bus 2, in order to check again if the predefined date volume was transmitted. This process is repeated until the predefined data volume has been transmitted on the bus.

While the first transmitter 3a is transmitting data elements on the bus 2, the remaining transmitters 3b and the receiver 4 import the data elements from the bus. In doing so, the importation of the data elements is synchronized by means of the timer signal of the respective transmitter 3b or the receiver 4. After each importation of a data element, at least those transmitters 3b which still have not transmitted any data elements on the bus 2 adjust the counter readings of their data volume counters according to the received data volume and compare them to a predefined data volume value allocated to one of the respective sensors 3b.

If the comparison indicates that the counter reading has not yet reached the predefined data volume value, the process is always repeated, i.e., another data element is imported from the bus 2, the data volume counter is adjusted accordingly, and the counter reading is compared again with the predefined data volume value. Once the counter reading of a transmitter 3b has reached the predefined data volume value, said transmitter begins to transmit its allocated, predefined data volume on the bus 2.

The data volume value of a second transmitter 3b corresponds to the data volume transmitted by the first transmitter 3a, so that the second transmitter 3b begins transmitting data on the bus 2 as soon as the first transmitter 3a has transmitted its allocated data volume on the bus 2. The data signal of the second transmitter 3b is designated by 19 in FIG. 5.

In like manner the data volume value of a third transmitter 3b corresponds to the sum of the data volumes transmitted by the first transmitter 3a and the second transmitter 3b, so that the third transmitter 3b begins to transmit data on the bus 2 as soon as the second transmitter 3b has transmitted its allocated data volume on the bus 2. The data signal of the third transmitter 3b is designated by 20 in FIG. 5.

Should the need arise, in like manner other transmitters 3b connected to the bus can transmit data over the bus 2. The individual transmitters 3a, 3b thus transmit their data over the bus 2 to the receiver 4 after one another, in a set sequence.

The transmitter 3a acting as a master and at least another transmitter 3b receive, when they themselves are not in the process of transmitting, the data elements transmitted over the bus 2 and check them for plausibility. Depending on the result of this check, after the end of each data transmission cycle the respective transmitters 3a, 3b transmit, always in sequence, status information in the form of, for example, a diagnosis bit, on the bus 2. The corresponding status signal is designated by 21 in FIG. 5. In the plausibility check, the data elements can be compared, for example, to a predefined, admissible data array.

In the method for transmitting data between at least two transmitters 3a, 3b and a receiver 4, wherein the transmitters 3a, 3b and the receiver 4 are connected to a bus 2, a synchronization signal is therefore applied to the bus 2 and a number of data volume counters, which corresponds to the number of transmitters 3a, 3b reduced by one, is set to a predefined initial value. A first transmitter 3a transmits a predefined data volume allocated to the transmitter in the form of data elements to the receiver 4 over the bus. For each additional transmitter 3b, 3a the following steps are carried out:
1) Reception of a data element from the bus 2,
2) Adjusting the counter reading of a data volume counter allocated to the respective transmitter 3b, 3a according to the received data volume,
3) Comparison of the counter reading with a predefined data volume value allocated to the respective transmitter 3b, 3a,
4) In the event the counter reading has not yet reached the predefined data volume value: repetition of steps 1)-4),
5) Transmission of data elements of a predefined data volume allocated to the respective transmitter 3b, 3a over the bus to the receiver 4.

The data volume value of the other transmitter 3b, 3a is selected or the data volume values of the other transmitters 3b, 3a are selected in such a way that at any given time only one transmitter 3a, 3b simultaneously transmits on the bus 2.

The invention claimed is:

1. A method for transmission of data between at least two transmitters and at least one receiver, wherein the transmitters and the at least one receiver are connected to a bus, comprising at least the following steps:
   a) applying a synchronization signal to the bus thereby setting at least a number of data volume counters corresponding to the number of transmitters reduced by one to a predefined initial value;
   b) for a first transmitter, carrying out the following steps:
      b1) transmitting data from the transmitter to at least the one receiver over the bus;
      b2) determining transmitted data volume of said data;
      b3) comparing the transmitted data volume with a predefined data volume allocated to the transmitter; and
      b4) repeating steps b1)-b4) if the determined transmission data volume is less than the predefined data volume allocated to the transmitter; and
   c) for each additional transmitter, carrying out the following steps:
      c1) receiving said data from the bus;
      c2) adjusting a counter reading of one of said data volume counters allocated to the respective transmitter according to the received data volume;
      c3) comparing the counter reading with a predefined data volume value allocated to the respective transmitter;
      c4) repeating steps c1)-c4) in the event the counter reading has not yet reached the predefined data volume allocated to the respective transmitter value; and
      c5) carrying out the steps b1)-b4) for the respective transmitter, wherein the data volume value of the other transmitter is selected or the data volume values of the other transmitters are selected so that at any given time only one transmitter transmits on the bus.

2. The method as in claim 1, wherein, with at least two data elements, a time interval for the transmission from the transmitter over the bus to at least the one receiver is different.

3. The method as in claim 1, wherein at least one transmitter checks a plausibility of the data transmitted over the bus, and a status signal based on a result of this check is emitted on the bus.

4. The method as in claim 1, wherein for at least one transmitter, the length of time during which the respective transmitter is in line for transmission of its data on the bus is specified, that a measured length of time is compared with a threshold value, and that in the event that the measured length of time corresponds to or is greater than the threshold value, another transmitter carries out the steps b1)-b4).

5. A communication device comprising:
   at least two transmitters, each including at least one data source and a first bus interface connected thereto, connected to a bus;
   at least one receiver connected to the bus, wherein the at least one receiver has a data sink and a second bus interface connected thereto;
   one of said at least two transmitters including a mechanism for transmission of a synchronization signal on the bus to other ones of said at least two transmitters to initialize said other ones of said at least two transmitters, wherein each of the first bus interfaces have a transmitter mechanism connected to the bus;
   a receiver mechanism connected to the bus and to a control mechanism;
   a measurement device connected to said receiver mechanism and having a data volume counter for measuring the volume of the data transmitted over the bus; and
   a comparator connected to the measurement device and to the control mechanism for comparing the counter reading of the data volume counter with at least one predefined data volume value, wherein the control mechanism of a first transmitter is connected with the receiver mechanism and the transmitter mechanism of said first transmitter whereby, after transmission of the synchronization signal, data of a predefined first data volume are transmitted on the bus by means of the transmitter mechanism from the data source of the first transmitter, wherein the control mechanism of at least a second transmitter is connected with the transmitter mechanism of said second transmitter so that, after receipt of a predefined second data volume allocated to the respective second sensor, data of a predefined third data volume are transmitted on the bus by means of its transmitter mechanism from the data source of the respective second transmitter, and wherein the first data volume, at least a second data volume, and at least a third data volume are selected so that at any given time only one transmitter transmits on the bus.

6. The communication device as in claim 5, further comprising a mechanism for sending a cycle length signal on the bus, wherein the transmitters have a timer connected to the transmitter mechanism for generating a timer signal, that at least one timer has a setting mechanism for setting the cycle length of its timer signal, and wherein the setting mechanism is connected to the receiver mechanism of the respective transmitter whereby the cycle length of the timer signal is settable as a function of the duration of the cycle length signal.

7. The communication device as in claim 5, wherein the data source has at least one sensor for detecting a measurement signal.

8. The communication device as in claim 5, wherein the transmitter mechanism has a pulse width modulator, by means of which a data signal having at least one first data signal section having a first signal level and a second data signal section having a second signal level can be generated, and that the length of at least one of said data signal sections is a function, of information stored in the data signal.

9. The communication device as in claim 5, wherein at least one transmitter has a mechanism for checking the plausibility of the data received by the bus and that preference is given to the mechanism for checking the plausibility being connected to the transmitter mechanism of the transmitter in such a way that a status signal based on the result of the plausibility check is emittable on the bus.

10. The communication device as in claim 5, wherein at least one transmitter has a measurement device for determining the length of time during which another transmitter is in line for transmission of data on the bus, that the measurement device is connected to a comparator for comparing the length of time with a threshold value, and that the comparator is connected to the transmitter mechanism of the first-mentioned transmitter so that, in the event the measured length of time corresponds to or is greater than the threshold value, data of the predefined data volume allocated to the first-mentioned transmitter are transmitted from the data source of said transmitter on the bus by means of the transmitter mechanism.

* * * * *